(12) United States Patent
Schiff et al.

(10) Patent No.: US 9,195,769 B2
(45) Date of Patent: Nov. 24, 2015

(54) METHOD AND APPARATUS FOR QUICKLY EVALUATING ENTITIES

(75) Inventors: Jeremy Schiff, Portola Valley, CA (US); Sourav Chatterji, Fremont, CA (US); Corey Layne Reese, Portola Valley, CA (US); Steven Charles Schlansker, Los Altos, CA (US); Leejay Wu, Mountain View, CA (US); Paul Kenneth Twohey, Palo Alto, CA (US)

(73) Assignee: OPENTABLE, INC., San Francisco, CA (US)

( * ) Notice: Subject to any disclaimer, the term of this patent is extended or adjusted under 35 U.S.C. 154(b) by 483 days.

(21) Appl. No.: 13/553,703

(22) Filed: Jul. 19, 2012

(65) Prior Publication Data

US 2013/0024465 A1 Jan. 24, 2013

Related U.S. Application Data

(60) Provisional application No. 61/510,004, filed on Jul. 20, 2011.

(51) Int. Cl.
*G06F 7/00* (2006.01)
*G06F 17/30* (2006.01)

(52) U.S. Cl.
CPC .... *G06F 17/30873* (2013.01); *G06F 17/30864* (2013.01); *G06F 17/30876* (2013.01)

(58) Field of Classification Search
CPC .............. G06F 17/30864; G06F 17/30876; G06F 17/30873
See application file for complete search history.

(56) References Cited

U.S. PATENT DOCUMENTS

| | | | |
|---|---|---|---|
| 6,370,513 B1 | 4/2002 | Kolawa et al. | |
| 7,653,761 B2 | 1/2010 | Juster et al. | |
| 7,818,394 B1 | 10/2010 | Lawler et al. | |
| 7,966,305 B2 | 6/2011 | Olsen | |
| 8,095,432 B1 | 1/2012 | Berman et al. | |
| 8,145,619 B2 | 3/2012 | Bowden et al. | |
| 8,347,211 B1 | 1/2013 | Rogers et al. | |
| 8,359,285 B1 | 1/2013 | Dicker et al. | |
| 8,719,198 B2 | 5/2014 | Zheng et al. | |
| 2006/0200435 A1* | 9/2006 | Flinn et al. | 706/12 |

(Continued)

OTHER PUBLICATIONS

International Search Report and Written Opinion of the International Searching Authority, Issued in PCT/US12/47473 on Oct. 10, 2012, 17 pages.

(Continued)

*Primary Examiner* — Loan T Nguyen
(74) *Attorney, Agent, or Firm* — Hickman Palermo Becker Bingham LLP; Daniel E. Miller (57) ABSTRACT

Embodiments of the invention relate to methods and systems for evaluating entities for a target user, the method comprising obtaining, at a server computer, entity data from a plurality of data sources. The entity data is then stored in an entity database. The method further comprises merging the entity data from the plurality of data sources, mapping the entity data to a corresponding entity, and differentiating the entity. Then a relevance is determined associated with the entity data and data source. The method further comprises generating a set of entity evaluations to the target user using the relevance, determining a set of one or more entities relevant to the primary user based on the entity data, user data, and the relevance, with an initial order of relevance, and displaying, on a user device, the set of relevant entities to the target user in the order of relevance.

26 Claims, 5 Drawing Sheets

(56) References Cited

U.S. PATENT DOCUMENTS

| | | | |
|---|---|---|---|
| 2007/0050192 A1 | 3/2007 | Gutta et al. | |
| 2007/0112761 A1* | 5/2007 | Xu et al. | 707/5 |
| 2007/0118498 A1 | 5/2007 | Song et al. | |
| 2007/0239702 A1* | 10/2007 | Vassilvitskii et al. | 707/5 |
| 2007/0282621 A1 | 12/2007 | Altman et al. | |
| 2008/0104059 A1 | 5/2008 | Segel | |
| 2008/0214162 A1 | 9/2008 | Ramer et al. | |
| 2008/0215565 A1 | 9/2008 | Sun et al. | |
| 2008/0244429 A1 | 10/2008 | Stading | |
| 2009/0024605 A1* | 1/2009 | Yang | 707/5 |
| 2009/0076928 A1* | 3/2009 | Hjertonsson et al. | 705/26 |
| 2009/0177644 A1 | 7/2009 | Martinez et al. | |
| 2009/0204600 A1 | 8/2009 | Kalik et al. | |
| 2009/0222304 A1 | 9/2009 | Higgins et al. | |
| 2009/0234664 A1 | 9/2009 | Schaffnit et al. | |
| 2009/0234878 A1 | 9/2009 | Herz et al. | |
| 2009/0271246 A1 | 10/2009 | Alvarez et al. | |
| 2010/0023508 A1 | 1/2010 | Zeng et al. | |
| 2010/0076968 A1 | 3/2010 | Boyns et al. | |
| 2010/0211558 A1 | 8/2010 | Bonabeau et al. | |
| 2010/0250336 A1 | 9/2010 | Selinger et al. | |
| 2010/0306229 A1 | 12/2010 | Timm et al. | |
| 2011/0125759 A1 | 5/2011 | Querel et al. | |
| 2011/0145066 A1 | 6/2011 | Law et al. | |
| 2011/0225291 A1 | 9/2011 | Dobroth et al. | |
| 2011/0231383 A1* | 9/2011 | Smyth et al. | 707/707 |
| 2012/0209839 A1 | 8/2012 | Andrews et al. | |
| 2012/0295640 A1 | 11/2012 | Mei et al. | |
| 2013/0041837 A1 | 2/2013 | Dempski et al. | |
| 2014/0258270 A1 | 9/2014 | Reese et al. | |
| 2014/0289228 A1 | 9/2014 | Mei et al. | |

OTHER PUBLICATIONS

International Search Report and Written Opinion of the International Searching Authority, Issued in PCT/US12/47476 on Oct. 1, 2012, 11 pages.
International Search Report and Written Opinion of the International Searching Authority, Issued in PCT/US12/47475 on Sep. 27, 2012, 24 pages.
International Searching Authority, "Search Report" in application No. PCT/US12/47478, dated Oct. 12, 2012, 19 pages.
International Searching Authority, "Search Report" in application No. PCT/US12/47476, dated Oct. 1, 2012, 11 pages.
International Searching Authority, "Search Report" in application No. PCT/US12/47475, dated Sep. 17, 2012, 24 pages.
International Searching Authority, "Search Reoprt" in application No. PCT/US12/47473, dated Oct. 10, 2012, 17 pages.
International Search Report and Written Opinion issued in PCT/US12/47478 on Oct. 12, 2012, 19 pages.
European Patent Office, "Search Report" in application No. 12815280.8-1952, dated Jan. 5, 2015, 8 pages.
Claims in European Application No. 12815280.8-1952, dated Jan. 2015, 4 pages.
Blount, S., "Talking Yellow Pages, Buyers in 20 Cities Now Let Their Fingers Do the Talking Through Automated Telephone Advertising Message Systems", vol. 10, No. 10, dated Oct. 1, 1987, 1 page.
European Patent Office "Search Report" in application No. 12815207.1-1952, dated Mar. 20, 2015, 13 pages.
European Claims in application No. 12815207.1-1952, dated Mar. 2015, 3 pages.
Claims in Australian Application No. 2012283930, dated May 2015, 5 pages.
Claims in Australian Application No. 2012283928, dated May 2015, 9 pages.
Australian Patent Office, "Patent Examination Report No. 1" in application No. 2012283930, dated May 5, 2015, 3 pages.
Australian Patent Office, "Patent Examination Report No. 1" in application No. 2012283928, dated May 12, 2015, 3 pages.
Claims in Canadian Application No. 2,842,255, dated Jul. 2015, 5 pages.
Claims in Australian application No. 2012283929, dated Jun. 2015, 8 pages.
Canadian Intellectual Property Office, "Examier Report" in application No. 2,842,255, dated Jul. 2, 2015, 5 pages.
Canadian Intellectual Property Office, "Exam Report" in application No. 2,842,215, dated Jul. 8, 2015, 3 pages.
Canadian Claims in application No. 2,842,215, dated Jul. 2015, 8 pages.
Australian Patent Office, "Patent Examination Report No. 1" in application No. 2012283929, dated Jun. 11, 2015, 3 pages.
U.S. Appl. No. 13/274,235 Filed Oct. 14, 2011, Office Action Aug. 18, 2015.

* cited by examiner

METHOD AND APPARATUS FOR QUICKLY EVALUATING ENTITIES

CROSS-REFERENCES TO RELATED APPLICATIONS

This application claims priority from U.S. Provisional Patent Application No. 61/510,004 filed Jul. 20, 2011 entitled "Method and Apparatus for Quickly Evaluating Entities".

The present disclosure may be related to the following commonly assigned U.S. Provisional Patent Applications: U.S. Provisional Patent Application No. 61/509,999 filed Jul. 20, 2011 entitled "Method and Apparatus for Explaining Recommendations", U.S. Provisional Patent Application No. 61/510,003 filed Jul. 20, 2011 entitled "Method and Apparatus for Allowing Users to Augment Searches", and U.S. Provisional Patent Application No. 61/509,995 filed Jul. 20, 2011, entitled "Method and Apparatus for Category Based Navigation".

The respective disclosures of these applications/patents are incorporated herein by reference, as if set forth in full in this document, for all purposes.

FIELD OF THE INVENTION

The present invention relates to recommendation systems in general and in particular to recommendation system that generates entity evaluation for users, via user devices, in order to present informative and intuitive recommendations.

BACKGROUND OF THE INVENTION

The Internet has become a useful source of information relating to goods and services, but because so many users and companies are connected to the Internet and providing information of their own, it is difficult to find relevant information among all available information. One area of information is in recommendations. As individuals and groups are now able to connect to the Internet and retrieve information from websites and via apps, and do so perhaps while in transit towards a geographic area of interest, they come to expect the ability to find information about goods and services being offered.

One source of information is in the form of websites hosted by or for providers. As used herein, "website" refers to a collection of one or more web pages displayable by a browser or other web client, the one or more web pages being hosted on a web server (i.e., a computer coupled to the Internet, or other network over which communication occurs) that responds to requests for pages hosted thereon. An example might be a restaurant that generates information about its hours, pictures of its dining room, contact information, history, menus and other offerings, then puts that information into a suitable form (such as HTML pages, dynamically generated pages, etc.), stores those pages in electronic storage accessible by the web server (hosted by the restaurant or perhaps a company that specializes in web presence that provides such services to the restaurant), and then serves those pages as client devices request pages. The information might also be presented in another form, such as data supplied to an app on the client device rather than a generic browser on the client device.

However the restaurant gets the information to interested users, it is still limited to information sourced by that restaurant. A number of websites have been set up to collect information from other customers of a vendor of goods or services and provide reviews and comments and other details to other customers or potential customers. For example, there might be a website that focuses on hotels, another on restaurants, and another on home repair, or a general one. However, these websites might just have too much information to be useful to a user searching for relevant recommendations.

Additionally, with the increase of users participating in social media websites, users are also interested in getting information about their friends, and the opinions of their friends. For example, a user may find out that a number of their friends on a social media website highly recommend a restaurant, which may be more persuasive to that user than the recommendations of strangers or high rankings on general rating websites. Thus, social media websites that provide information to a user regarding the user's friends may also be another source that the user refers to in gathering information and searching for relevant recommendations. However, social media websites allow users to provide a wide variety of information that may or may not be related to what a user is searching for (e.g., status updates unrelated to a vendor of goods or services), and it is also difficult to cross-reference the recommendations of friends through social media websites with general websites providing reviews, or websites for particular businesses, in a user's search for relevant evaluations of recommended venues.

An improved evaluation system is desirable.

BRIEF SUMMARY OF THE INVENTION

Embodiments of the invention relate to an improved computer-implemented method for evaluating entities related to the personalized recommendations provided to users. Existing methods for evaluating entities for personalized recommendations to a target user may not provide explaining factors and processes used to determine the personalized recommendations, evaluate entities efficiently particularly for personalized recommendations, and/or display the entity evaluations optimally. Users may not find the entities they are looking for, or may overlook entities that fit their criteria if the entities are not evaluated properly with the target user(s) in mind, or if the evaluation is not displayed in a manner that the target user can locate the entity evaluation quickly. Since there is a massive amount of data related to a plurality of entities, the data must be merged, differentiated, and evaluated such that the resulting entity evaluation is relevant to users, accurate, and efficient.

Thus, quickly evaluating entities for personalized recommendations to the target user is advantageous and allows users to efficiently find what they are looking for in concise and relevant evaluations. Additionally, entity evaluation systems, and other systems in use of such entity evaluation systems (e.g., data search systems, personalized recommendation systems, data navigation systems, etc.) are improved in this manner by becoming more intelligent about providing more relevant and efficient entity evaluations for personalized recommendations.

An embodiment of the invention relates to an entity evaluation system executing a computer-implemented method for evaluating entities for a target user based at least on stored data about the target user, the method comprising obtaining, at a server computer, entity data from a plurality of data sources, wherein the entity data is associated with an entity in a plurality of entities, wherein the entity provides goods or services to the target user. The entity data is then stored at the server computer, wherein the entity data associated with the plurality of entities is stored in an entity database. The method further comprises merging entity data from the plurality of data sources, mapping the entity data from the plurality of data sources to a corresponding entity, and differentiating the entity data from the plurality of data sources associated with the corresponding entity. Then the server computer determines a relevance associated with the entity data and data source, wherein the relevance is determined by a computer process to cross-reference the entity data and data source, assigns a weight to the entity data and the data source associated with the entity data based on the relevance, and updates the entity database with the entity data associated with the corresponding entity. The method further comprises generating a set of entity evaluations to the target user using the updated entity database, determining a set of one or more entities relevant to the primary user based on the entity data, user data, and relevance, determining initial order of relevance of the set of relevant entities based on the relevance and set of entity evaluations, and displaying, on a user device, the initial order of relevance of the set of relevant entities to the target user, wherein the target user provides a response to entities in the set of relevant entities via the user device.

In another embodiment of the invention, the method further comprises obtaining, at the server computer, feedback data from a plurality of users, wherein the feedback data is associated to the target user in the plurality of users. The entity evaluation system may obtain location data from an external data source in a plurality of data sources associated with the target user, wherein the location data is associated with an entity in a plurality of entities, and store the location data at the server computer, wherein location data associated with the plurality of entities is stored in the entity database. The method further comprises determining an entity that is associated with the feedback data from the target user, determining if the entity associated with the feedback data from the target user corresponds with an entity associated with location data in the entity database, and mapping the entity associated with the feedback data to the corresponding entity associated with the location data, wherein if the entity associated with the feedback data from the target user does not correspond with an entity associated with location data in the entity database, the entity database is updated to include the entity associated with the feedback data from the target user. The entity evaluation system then updates the entity database to include the feedback data from the target user associated the entity, with the location data associated with the corresponding entity, generates an updated set of relevant entity evaluations to the target user based on the updated entity database, and determines an updated order of relevance of the updated set of relevant entity evaluations based on the feedback data. Lastly, the entity evaluation system then displays, on the user device, the updated order of relevance of the updated set of relevant entity evaluations to the target user.

In yet another embodiment of the invention, the method further comprises obtaining, at the server computer, personal data from the plurality of data sources, and storing the personal data at the server computer, wherein personal data associated with the plurality of users is stored in a user database. The entity evaluation system then merges the personal data from the plurality of data sources, maps the personal data from the plurality of data sources to the target user, and updates the user database with the personal data and stored data associated with the target user. The method further comprises the entity evaluation system determining whether an entity is associated with the personal data from the target user, determining whether the entity associated with the personal data corresponds with an entity associated with location data in the entity database, and mapping the entity associated with the personal data from the target user to the corresponding entity associated with the location data. Next, inferred location data may be determined based on the mapping, the entity database updated to include the inferred location data associated with the corresponding entity. The entity evaluation system then creates a personal profile for the target user based on the personal data, wherein the personal profile is stored in a user database, analyzes the personal data and stored data associated with the target user to determine a user-specific relevance, and updates the personal profile of the target user with the user-specific relevance. The method further comprises generating an updated set of relevant entity evaluations to the target user based on the updated personal profile and the user-specific relevance, determining an updated order of relevance of the updated set of relevant entities evaluations based on the updated personal profile of the target user; and displaying, on the user device, the updated order of relevance of the updated set of relevant entity evaluations to the target user.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

A system for quickly evaluating entities whose evaluations may be used in many contexts, including recommendations or searches for physical places, physical goods, services, relationships, experiences, virtual goods, or some combination thereof is disclosed.

In the discussion which follows we talk of a user performing an evaluation, but the same method and apparatus work for a set of users using the same or different devices. The users and devices may be in physical proximity or not. The users may perform the evaluations in temporal proximity or not. In some embodiments, there may be multiple simultaneous target users, or there may be one target user and several associated users for whom searches should also be relevant. Input data from such multiple users can be presented synchronously or asynchronously. Some embodiments may provide methods of operation in which they do not need to know who a user is; for example, there may be a kiosk mode in which members of the public can use the system without identifying themselves.

An improved evaluation system is described herein. In order to provide a context for describing embodiments of the present invention, embodiments of the invention will be described herein with reference to a user device that provides entity evaluations. Those skilled in the art will recognize, however, that the present invention is not limited to such embodiments.

It should be understood that, given the complexity of the operations performed, the invention is implemented using computing elements and may also include communication elements that convey data between disparate locations.

In various embodiments, systems which recommend entities may use a variety of algorithmic approaches to produce predicted evaluations or recommendations of entities, hereafter referred to as evaluations. Prior to discussing embodiments of the invention, some terms used herein are described below:

"Evaluations" according to embodiments of the invention may be along a single or multiple dimensions, and/or over a discrete or continuous domain. Evaluations may be presented in a numerical, textual, pictorial, auditory, or tactile fashion. Evaluations may include any of these characteristics, either alone or in combination. For example, a user may rate a restaurant on a scale of 1, 2, 3, 4, or 5 stars, with 1 star being the lowest rating, and 5 stars being the highest rating. In another realization, a user may instead rate a restaurant on a 1-5 star scale for taste rating, 1-4 "$" scale for price rating, and add an optional one word description. Another example of an evaluation (e.g., recommendation) involves having a team of doctors choosing a picture that best represents the mood of a clinical patient. Another example of an evaluation or recommendation may include citizen journalists recording a five second video to make a review or recommendation, or an audio summary of a protest or event. In another example, evaluations may use three dimensional sensing technologies to have dancers record their expressions in response to listening to a composition. Another example may include a user operating an application on a mobile device, and dragging pictorial representations of dishes into different groups or piles categorized as "tasty", "yucky", and "only sometimes". In another example, a recommendation may be inferred from aspects of a user's behavior such as whether the user looks in one direction or another, or whether the user walks or turns in one way or another.

A "recommendation" according to embodiments of the invention may refer to an output of a personalized recommendations system, or other relevant system. The recommendation may be a prediction related to what a user would evaluate an entity as or how the user would evaluate the entity. The recommendations may take into account a time of day, for example, a user may evaluate an entity poorly for a lunch, but may evaluate the entity highly for a dinner, if the user feels the entity is more appropriate for dinner.

An "affinity graph" according to embodiments of the invention is a model of the affinity between users or entities and users or entities, either in general or with respect to a given attribute or cluster of attributes of the users or entities, as a graph. Affinity graphs may represent relationships between users and entities, users and other users, or entities and other entities, and may be used to determine recommendations. Attributes provide additional information about a node in the graph. For example, an attribute may be the zoom level of a camcorder type or the primary cuisine type of a restaurant. Entities may be represented by nodes, with individual users being one type of entity. Edges represent relationships between nodes. Directional edges can model unidirectional relationships, such as if person A follows person B on Twitter. A symmetric relationship, like friends on Facebook, may be represented as two directional edges, or a unidirectional edge.

System Overview

Figure 1:
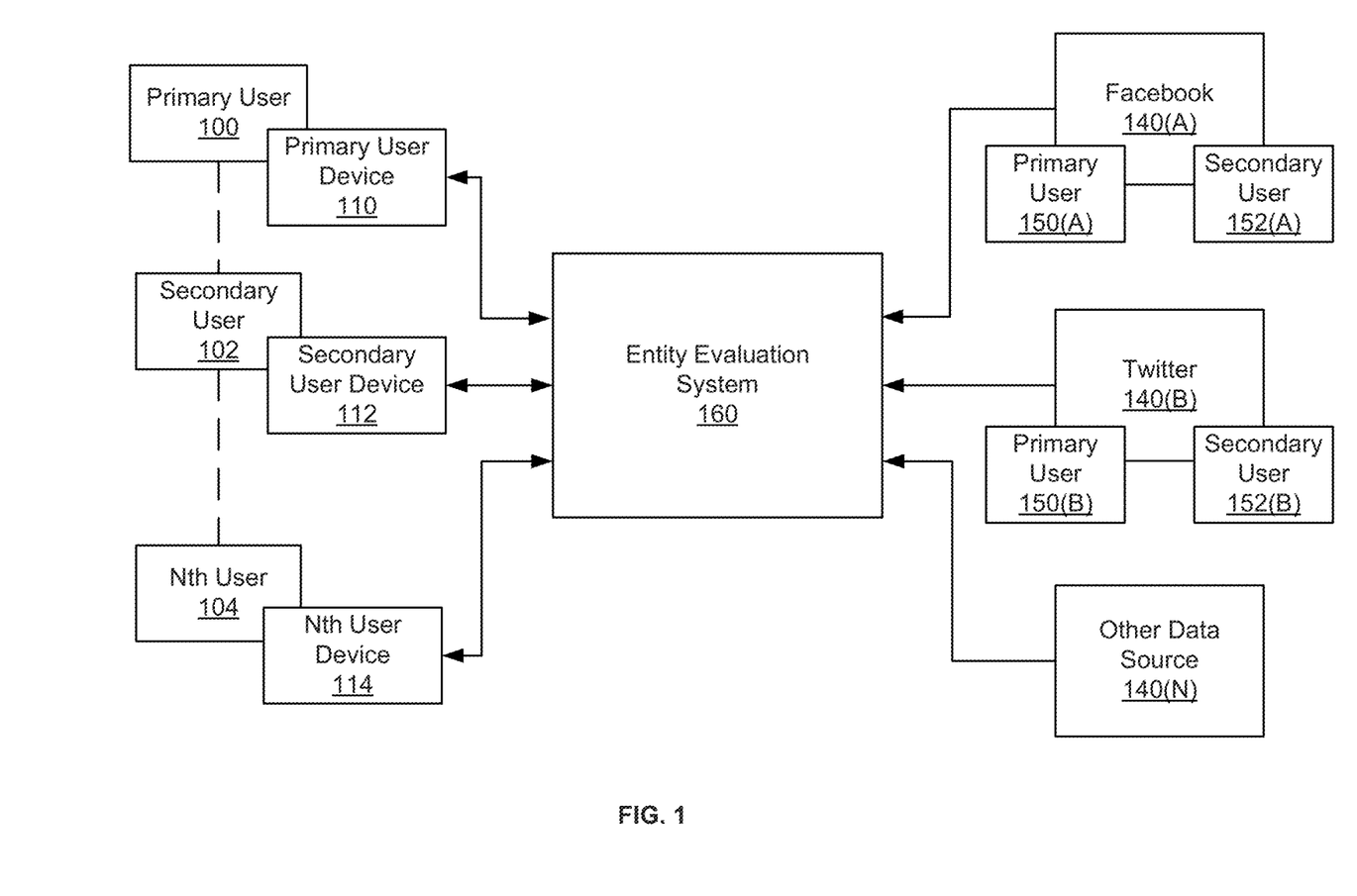
FIG. 1 is a block diagram of a navigation system according to aspects of the present invention.

In FIG. 1, an exemplary entity evaluation system according to an embodiment of the invention is shown. The entity evaluation system 160 may be coupled to a plurality of users, such as a primary user 100, secondary user 102, or any number of users 104. There may be relationships between specific users, for example, the primary user 100 and secondary user 102 may be friends, family members, or co-workers. The plurality of users may be coupled to the entity evaluation system 160 through associated user devices 110, 112, and 114. User devices may include mobile phones (e.g., a Blackberry™ phone, an iPhone™ device, an Android™ device), tablets (e.g., an iPad™ tablet), or other electronic devices.

The entity evaluation system 160 may obtain inputs from any number of users 100, 102, and 104, registered with the entity evaluation system 160. The users 100, 102, and 104 may be interconnected and have relationships with one another. The inputs may be transmitted through the user devices 110, 112, 114 via an application. The user devices 110, 112, 114 may be connected to the entity evaluation system 160 through the internet, a wireless network, a telecommunications network, or any suitable communications network. For example, the primary user 100 may use the primary user device 110 to download and install an application issued by the entity evaluation system 160. Through the application, the primary user 100 may edit personal ratings for entities, such as venues and restaurants, and other personal preferences, such as cuisine, type of food, price range, location, distance from current location, etc. The primary user 100 may also provide feedback items or data through the application to respond to recommendations, to add or remove entities, and/or rate an experience at an entity. In other embodiments of the invention, entities may include merchants and service providers.

Additional inputs to the entity evaluation system 160 may come from external data sources, for example, a social network computer system such as the Facebook™ computer system 140(A), a public messaging system such as the Twitter™ messaging system 140(B), and/or any number of other data sources 140(N) via the user accounts 150(A), 150(B), 152(A), 152(B) with the data sources and/or user devices 110, 112. The external data sources may also provide raw location data of the users, for example, through a "check-in" through system 140(A), system 140(B), or other social networking provider system capable of providing raw location data. The other data sources 140(N) may themselves have associated user accounts, which may map directly or indirectly to user accounts of other systems. The system may learn from these sources and others, such as use of GPS or mobile phone tower proximity, information about where a user tends to be located. For instance, it may make an inference about where the user's home or work is, or where the user tends to travel for various errands.

Evaluating Entities

In some embodiments, an entity evaluation system may be coupled to a separate personalized recommendations system providing recommendations to user based on entity evaluations. In other embodiments, the entity evaluation system may be the same system as the personalized recommendations system and/or a personalized recommendations explanation system. Additionally, a personalized navigation system may be separately coupled to, or operate as the same system, as the entity evaluation system, the personalized recommendations system, and/or both.

The evaluation mechanism may include a display of a prediction for the user's evaluation of the entity and possibly an optional explanation or explanations of the predicted evaluation where the explanation may use some combination of textual, visual, auditory, and tactile outputs. Example user evaluations include textual (e.g., a short 20 word comment), continuous as in a ratings slider, discrete as in star ratings, pictorial as in having the user choose a representative picture or photograph which most closely resembles the entity, auditory as in a volume measurement or review, gestural as in swipe up or down, gaze as in looking at the entity or spending more or less time looking at the entity, visual as in an interpretive dance for the entity, or some combination thereof. User evaluations may involve having the user add edges or weights or some combination of both to one or more affinity graphs.

The entity evaluation system may use affinity graphs as models of the affinity between users or entities and users or entities, either in general or with respect to a given attribute or cluster of attributes of the users or entities, as a graph. Affinity graphs may represent relationships between users and entities, users and other users, or entities and other entities, and may be used to determine recommendations. Attributes provide additional information about a node in the graph. For example, an attribute may be the zoom level of a camcorder type or the primary cuisine type of a restaurant. Entities may be represented by nodes, with individual users being one type of entity. Edges represent relationships between nodes. Directional edges can model unidirectional relationships, such as if person A follows person B on Twitter. A symmetric relationship, like friends on Facebook, may be represented as two directional edges, or a unidirectional edge.

These relationships may be about different associations other than social affiliations, such as an expertise graph where an edge from user A to user B indicates that user A believes user B to be an expert. There may also be weights on these edges, which for example, might represent the confidence in another user's expertise, or represent how familiar two users are with each other. Affinity graph nodes may be further augmented with additional information such as short form textual messages, pictures, check-ins, other explicit or implicit annotations that are used to denote a user has visited or prefers a location, or other explicitly tagged content. The affinity graph may be constructed by users choosing to link themselves to other nodes, or by aggregation and analysis methods which infer the links and weights.

In some embodiments, such inputs may be used as evaluation data by an entity evaluation system to generate evaluations and aid a personalized recommendations system to provide recommendations and/or recommendation explanations to users. The entity evaluation system may be operated by the entity evaluation systems, or they may be operating separately or in conjunction with one another. Exemplary evaluation data used by the entity evaluation system may include ratings on a discrete star scale for the quality of a restaurant for a restaurant discovery website/product or answers to personality questions for a match making website/service. Evaluation data may be associated with one entity or a set of entities. For example, a user may rate Jane's Sushi 90/100 and may rate sushi restaurants in general 82/100.

In various embodiments, the entity evaluation system may use a catalogue or database of entities which may have a fixed or variable number of attributes. The entity database or catalogue of entities may be local to the device displaying results, or reside remotely on other machine(s) which provide an interface to the catalogue. The catalogue or database may be static or changing over time. Both the user and the entity databases could be NoSQL databases, an SQL database, another information retrieval system such as a computer filesystem, or an in-memory data store. In other embodiments, the system could have a temporary piece of data obtained from a third-party on demand, such that data does not need to be statically or locally stored. A database could consist of multiple storage facilities, such as a cache backed by a database or a normalized authoritative database and denormalized in-memory stores.

Examples of entity types and their attributes include physical places such as restaurants, hotels, and spas along with their hours of operation, price range, and the availability of parking. Other physical entities may include items like camcorders along with their feature attributes such as zoom and manufacturer, meals along with ingredients, and opera tickets along with a description of the performance, the view of the stage, and the lead singer(s) for the evening. Entities may be people in a number of contexts, for example a saleswoman along with her quarterly numbers and three most prominent leads. Entities may also be the relationships between people, for example a pairing of a project manager and engineer along with features they have co-developed or a service team at a manufacturing facility and statistics about their efficacy. Entities may also be relationships between other entities in the catalogue or other catalogues, for example a collection of stocks grouped with an investment sector like health care. Entities may also be one-time or recurring events such as concerts. Entities may also be documents or sections of documents such as text pages or musical compositions.

Entities from the entity database may be displayed to the user in a manner allowing a rapid evaluation of the entity where such evaluation can be either the user experience itself or a component of a larger system (e.g., personalized recommendations system). User evaluations may be used to enhance many types of information systems, including information retrieval, recommendation, ranking, personalization, social contextualization, data entry, and quality control procedures and flows, either in isolation or in combination, with other signals or systems (e.g., personalized recommendations systems, personalized category based navigation systems, personalized recommendation explanation systems, etc.). For example, the user evaluations in a restaurant entity evaluation system may be supplied to a recommendation engine operated by a personalized recommendations system which may use those evaluations in combination with the evaluations of other users in order to supply personalized restaurant recommendations to the evaluation user. As another example, a bar evaluation system may order bars with user check-ins (e.g., from a service such as FourSquare), or other explicit or implicit annotations used to denote a user has visited or prefers a location over other bars without such annotations. As an additional example, a different bar evaluation system may weigh bars with check-ins of a user's relations in an affinity graph or graphs ahead of bars without such check-ins. In some embodiments of the invention, the entity evaluation system may be in communication with a recommendations system and provide the recommendations system with entity evaluation data such that the recommendations system may generate personalized recommendations based on the entity evaluation data. The recommendations system that is in communication with the entity evaluation system might also generate personalized recommendations on the basis of any other data it has available.

The entity evaluation system according to embodiments of the invention may have a variety of options for the initial ordering of entity evaluations presented to the user including a manually curated category ordering, orderings computed based on the context of the user and their evaluations, optionally including their previous evaluation history, and popularity. Popularity may be computed globally, through a single popularity computation for each user that takes relevant attributes of the user into account, or in a manner that takes into account relevant user contextual information. It could be computed using a variety of metrics incorporating different spatial, temporal, social, demographic, and user interaction based signals either alone or in combination, and predictions of values based on such metrics. Examples include counting the number of check-ins (from a service such as Gowalla or Facebook) to places with a given cuisine, counting the number of check-ins on Tuesdays between 3 pm and 4 pm to a place with a given cuisine, counting the number of times a cuisine was queried using a search or discovery service, counting the number of times a dish which is part of a cuisine was queried for on weekends using a search or discovery service, and the relative popularity of female users who explicitly state they like one cuisine (sushi) over another (Italian) on an online service with profiles such as Wordpress.com.

Examples of initial contextual information may include the time the user is navigating the categories, demographic information about the user, the location the user is querying from as determined by a GPS or other location sensing method, explicit input from the user's affinity graph, and implicit input from the user's affinity graph, individually or in combination.

Implicit input from a primary user's affinity graph may include analysis of textual messages linked directly or indirectly to a primary user node. The entity evaluation system according to embodiments of the invention may use natural language processing (NLP), and optionally sentiment analysis, on user generated messages, such as those on Facebook, and Twitter, to understand the content of messages. First, name-entity recognition may be performed to understand the mapping between a message, for instance a short-form message on Facebook (e.g., status update or post), and the entity in our system, such as a location, an event, or a cuisine type which the message is about. The entity evaluation system may then optionally perform sentiment analysis on the messages to understand whether an experience at a given entity was a positive or negative experience, and to what degree. The sentiment analysis may go further to understand why the users had a good time, for example, at a restaurant, if the users enjoyed the food, ambiance, service, etc. The mapping recognized by NLP and sentiment analysis may serve in weighting the category ordering for navigation, either alone or in combination with other inputs. It may also be used for selection of what entities to propose for rating. NLP analysis is not limited to a single dimension: for example, it might estimate all three of whether an entity is expensive, whether it has good overall quality, and whether it is good for a particular purpose.

Implicit input may also be in the form of explicitly denoting that a primary user may have frequented a location and using that to infer the user's preference for the location, either alone or relative to other locations. One example is using check-ins on a service like FourSquare to infer that since a user checked into 50 different sushi restaurants and never an Italian restaurant, that they have a preference for sushi over Italian. Another example is using the time of check-ins to infer that a user prefers to frequent day spas in the morning and not the afternoon. These features do not have to be restricted to user-only or category-only. For example, when adjusting a group of user's statistics, the entity evaluation system may cluster the users' category orderings based on the demographic information of the users, and the number of check-ins in a specific category, rather than just the categories themselves.

Implicit input can also take the form of counting or statistically analyzing augmented attributes of the affinity graph. For example, counting that existing Miami, Fla. users in aggregate prefer deep tissue massage over Thai style massage could indicate that new users from Miami Fla. may have deep tissue massages be shown to them at a higher order of relevance than Thai style massages in a massage category ordering. The demographic data can involve one augmented attribute, such as a user's hometown, or a combination of other attributes, such as political affiliation, gender, and age.

As the primary user navigates through entity evaluations displayed to the primary user, the entity evaluation system may track and monitor the primary user's usage with various metrics which may be used alone or in combination to alter the entity evaluation ordering(s) shown to the primary user. The ordering (e.g., order of relevance) may change at any time. For example, the order may change before a primary user chooses an entity based on an entity evaluation, immediately after a primary user choses an entity, at a fixed time each day, or at an arbitrary point in the future. The change in the order of relevance may or may not happen in synchrony when the primary user is interacting with the application (i.e., app) on his or her user device (e.g., mobile phone, tablet). For example, the order of relevance could change when the app is opened for the first time, when the primary user is viewing a part of the app without interacting with the entity evaluation ordering, or in the background when the primary user is not interacting with the app as well. As another example, the order of relevance could change depending on the time of day or depending on whether the user is accessing the app through a mobile device or a desktop computer. As another example, where the user interacts with the app through a wearable computer the order of relevance could take into account that fact as well as information accessible through the wearable computer, like the user's posture.

Adjusting the order of relevance of the entity evaluations does not have to work in a binary way between an initialization set and then according to information from the user, such as an explicit response from the user via interacting with the app. The information from the primary user can be incorporated gradually, and affect the order of relevance in more severe ways as more information is learned about the primary user or a group of users preferences. For example, if there are two categories A and B, and the criteria for determining an order of relevance includes a number of times a specific entity or entity evaluation is selected (e.g., by clicking on the mobile app), both A and B could be pre-seeded with a number of clicks. If A was seeded with 5 clicks and B was seeded with 3 clicks from the initialization, it would require B to be clicked on 3 more times than A for B to gain ordering preference over A (e.g., having B placed at a higher order of relevance to the primary user over A). In other examples a statistical technique such as a shrinkage estimator might be used.

Metrics used may also include the time the primary user took to make a choice, the categories visible when the primary user made a choice, the categories the primary user recently viewed before making a choice, the time of day and date the user made the choice, the frequency and distribution with which a user has chosen a category both with respect to their choices and the choices of relevant cohorts of the population including the whole population, or the number of times and the manner in which the user has navigated the category display. Additionally, pictures or other media objects may be displayed along with the category (for example, which picture is displayed along with the sushi category in food navigation environment). Other metrics may include how the user has evaluated entities in a given category, and the location as determined by a GPS or other location sensing mechanism when the user makes a choice.

The order of relevance in which entities to be evaluated are displayed to the user may depend on a number of factors including the time of day, the user's current or past location, the time the user has been on the current screen, the time the user has taken to evaluate previous entities, the information gain a ranking or other information retrieval system would obtain from such a user evaluation, the user's affinity graph or graphs, and a recommendation system either alone or in combination. The order of relevance may involve criteria beyond that required for increasing the predictive accuracy of an entity evaluation system, for example having the user label a gauge to simplify algorithmic complexity. The order of relevance may also depend on attributes of the entities under consideration either directly or as function of other inputs. For example, a place evaluation system may order entities located close to the user's current location above those farther away. As another example, a dish evaluation system may order dishes containing anise ahead of those with bacon. As another example, a system may rank highly entities chosen in a manner to lead to higher-variance ratings (such as more one-star and five-star ratings), or to lead to higher-variance predictions of user ratings in an associated recommendation system. A potential advantage of higher-variance predicted ratings is that users might find more value in a recommendation system that gives plenty of one- and five-star ratings as opposed to giving everything a three-star rating.

The ordering may be constructed in such a way as to reduce the computational, algorithmic, or derivational complexity of the system. For example, certain entities may be displayed first because knowing their evaluations makes it computing the similarity between users efficient.

The order or relevance may incorporate additional factors such as how often an entity has been evaluated on a metric, how frequently it has been explicitly queried, how often it is returned as the result in a search, discovery, recommendation, or evaluation system, how often it has been skipped, and other navigation or searching patterns which may arise from analyzing access patterns and query logs. These factors may be used alone or in combination. For example, the most commonly queried restaurant may be ordered before all others while the most commonly skipped restaurant might be ordered lastly behind all others.

When the entity evaluation system uses the user's affinity graph or graphs in selecting entities for evaluation it can do so in both explicit and implicit ways. Examples of explicit utilization of a user's affinity graph or graphs include prioritizing the entities rated by a user's followers or by the entities a user follows and selecting from a list of curated entries from a related node on the affinity graph or graphs. Additional examples of explicit utilization include using a FourSquare check-in (or other explicit or implicit annotations used to denote a user has visited or prefers a location or entity) to prioritize places a user has visited over those they have not. Examples of implicit use of a user's affinity graph or graphs include computing the similarity of a user to nearby nodes on the affinity graph or graphs using a recommendation or other ranking system and then selecting informatively evaluated items from such nodes. In this context, it can be determined how informative an evaluation is using a variety of metrics such as local or global information gain, the difference an evaluation has from global or cohort norms, evaluations which differ significantly from their previously predicted values, and entities whose distribution of evaluations differs in a statistically meaningful way. Examples include either global or geographic or ensuing is norms. The entity evaluation system selects entities about which the user or users might have an extreme opinion, for example a loved or hated bar.

In another embodiment of the invention, the entity evaluation system monitors user evaluations over time and tracks actual user evaluations compared to predictions and uses this information to compute a confidence score for both internal diagnosis and determining whether to show predictions to the user.

As the user evaluates entities the system can provide the user guidance as to how many more entities they should rate to achieve various goals. Goals might be steps in a service sign up process, the earning of a badge or virtual good, or an expertise certification or award such as "Sally is a sushi connoisseur". The guidance can be textual, pictorial, auditory, an animation, or tactile (such as the vibration of a mobile device) either in isolation or a combination. Goals do not have to be linear or independent, but might be. For example, the entity evaluation system may have three goals: (a) rate 10 places, (b) rate 5 places you love, and (c) rate 10 places you hate. Satisfying (c) also satisfies (a). Examples of guidance towards goal completion might include the notion of levels, icons which increase in brightness or otherwise progressively fill in as the goal nears completion, giving the user badges or showing pictograms, prerecorded or computer generated speech encouraging the user, changing the colors or other display properties of various display elements either alone or in combination, offers of coupons or other economic inducements, video or audio plays more (or less) as the user makes progress, two or three dimensional models whose display or rendering changes depending on progress (for example, more realistic sharing), and a progress bar, either alone or in combination.

Figure 2:
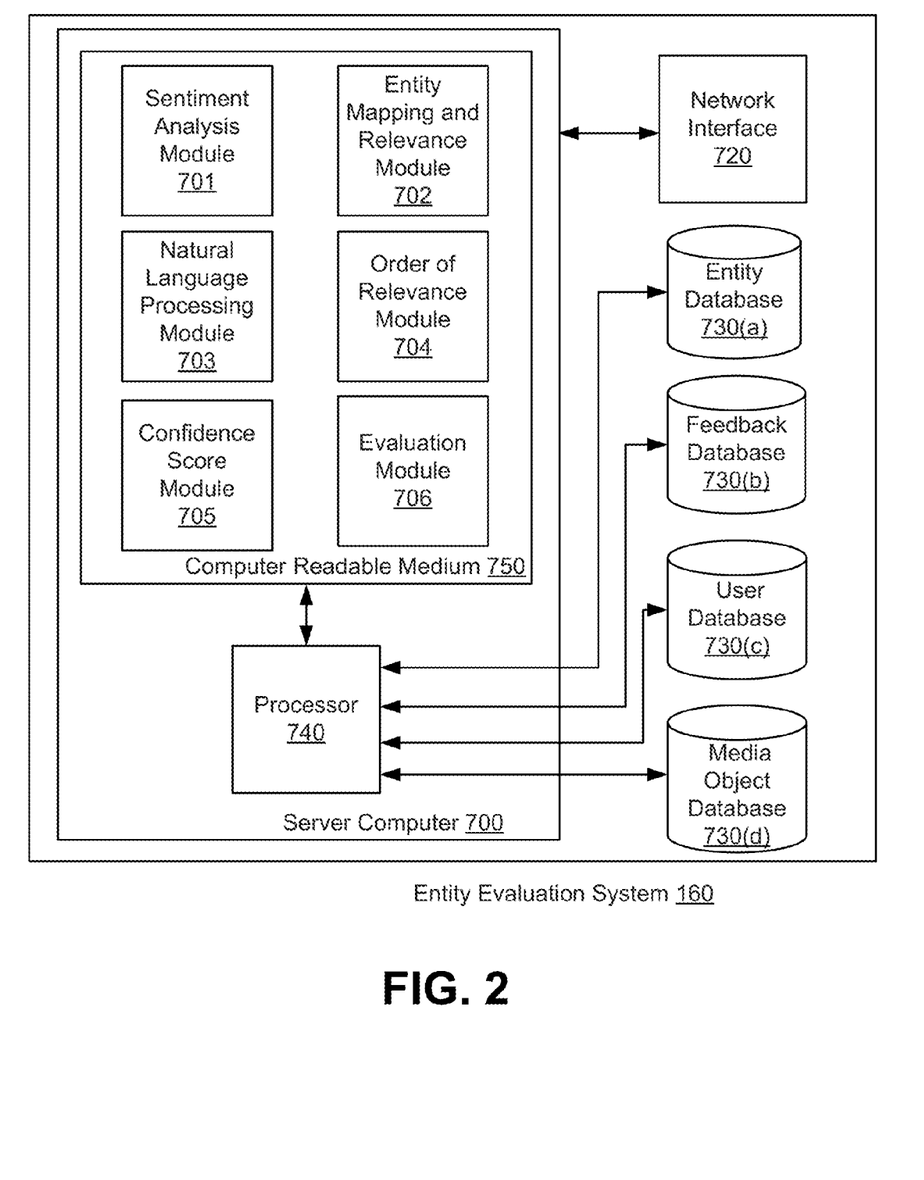
FIG. 2 is a block diagram of a modularized navigation system according to aspects of the present invention.

FIG. 2 shows a block diagram of an exemplary modular entity evaluation system 160 according to an embodiment of the invention, where the entity evaluation system 160 is configured to provide entity evaluations of relevant entities in an order of relevance to a target user.

The entity evaluation system 160 may comprise a server computer 700, which may be a single computer, a cluster of computers, a server, or a super computer. Processes and methods implemented by or at the server computer could also be implemented by or at a client, in various embodiments. The server computer 700 may comprise a processor 740, and a non-transitory computer readable medium 750, on which code is stored. There may be several databases to store data, for example, an entity database 730(*a*), a feedback database 730(*b*), a user database 730(*c*), and a media object database 730(*d*). Stored in the entity database 730(*a*) may be entity data relating to entities, including entity meta-data (e.g., location, hours of operation, specialty, rating). Entity meta-data may include any sub-category of data related to the entity. The feedback database 730(*b*) may store user feedback (implicit and explicit) from a plurality of users. The user database 730(*c*) may store user data obtained from a plurality of users, such as real-time data from social networking sites (e.g., tweets, status updates), and stored data related to a plurality of users, such as user preferences and settings (e.g., gender, dietary restrictions). The real-time data may be explicit or implicit, and may include text, images, video, audio, or other media. The user data may be directly obtained from the user or may be obtained from external data sources, such as a social networking site associated with the user. The entity evaluation system 160 may also include a media object database 730(*d*), storing media objects, such as high resolution photos. The media objects may be associated with entities, recommendations, and/or the target user, and may be used in the display of the entities in their categories and order of relevance.

The code stored on the non-transitory computer readable medium 750 may be in modules, and is executable by the processor 740 to perform functions, which are implemented as processing steps described above by the entity evaluation system providing recommendation explanations. The non-transitory computer-readable medium 750 may comprise software modules, such as a sentiment analysis module 701, an entity mapping and relevance module 702, and a natural language processing (NLP) module 703, an order of relevance module 704, a confidence score module 705, and an evaluation module 706. The functions of these modules are described in the process flows described above, and work in conjunction with external data sources (e.g., Facebook, Twitter), and users using user devices running an application (e.g., mobile app).

The entity evaluation system 160, to communicate with external data sources, social networking sites, and users, may include a network interface 720. The network interface 720 includes hardware and software that enables the entity evaluation system 160 to transmit and receive data over the Internet or any other communications network (e.g., telecommunications network, cable, radio).

User Display

Figure 3:
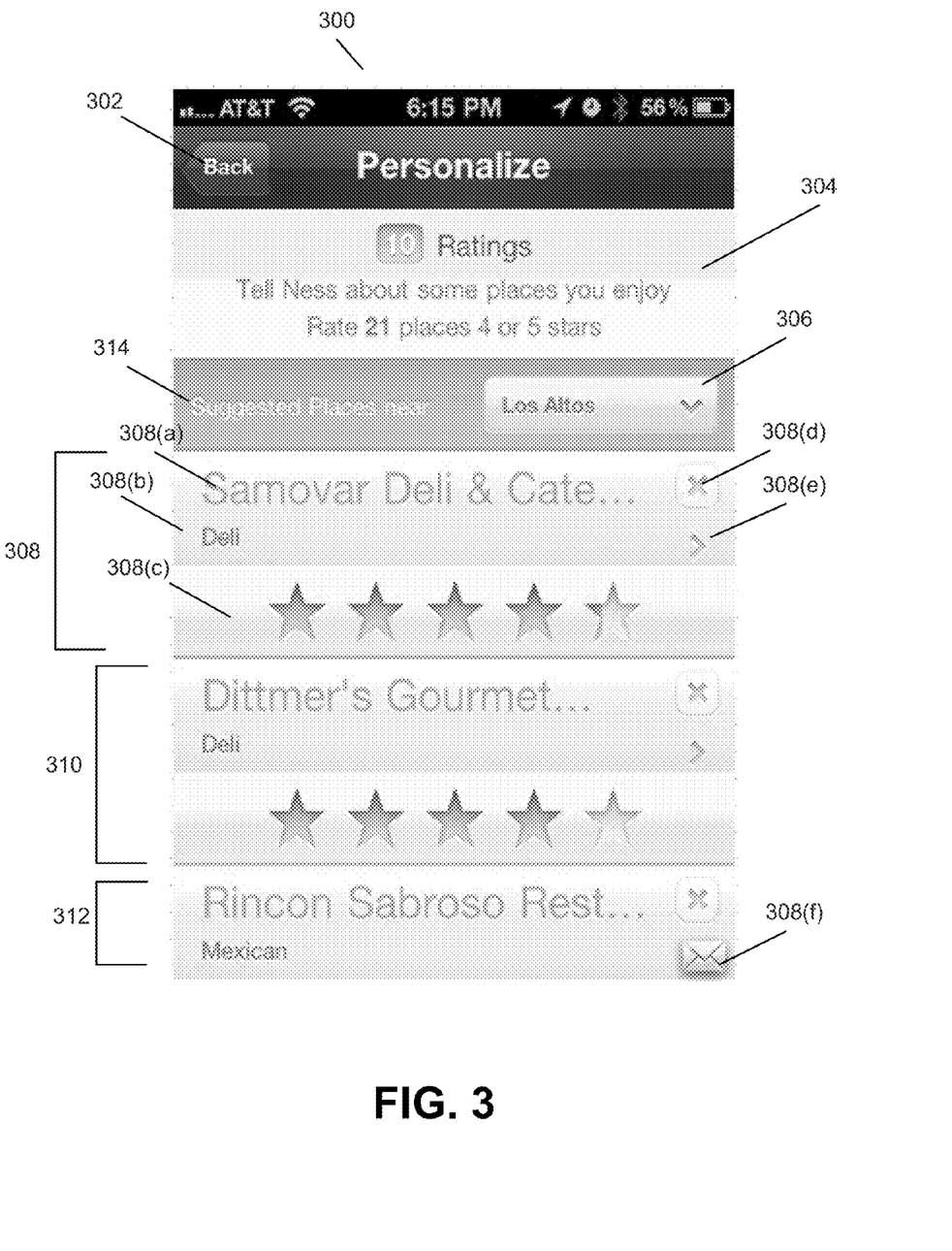
FIG. 3 illustrates an exemplary user display according to aspects of the present invention.
Figure 4:
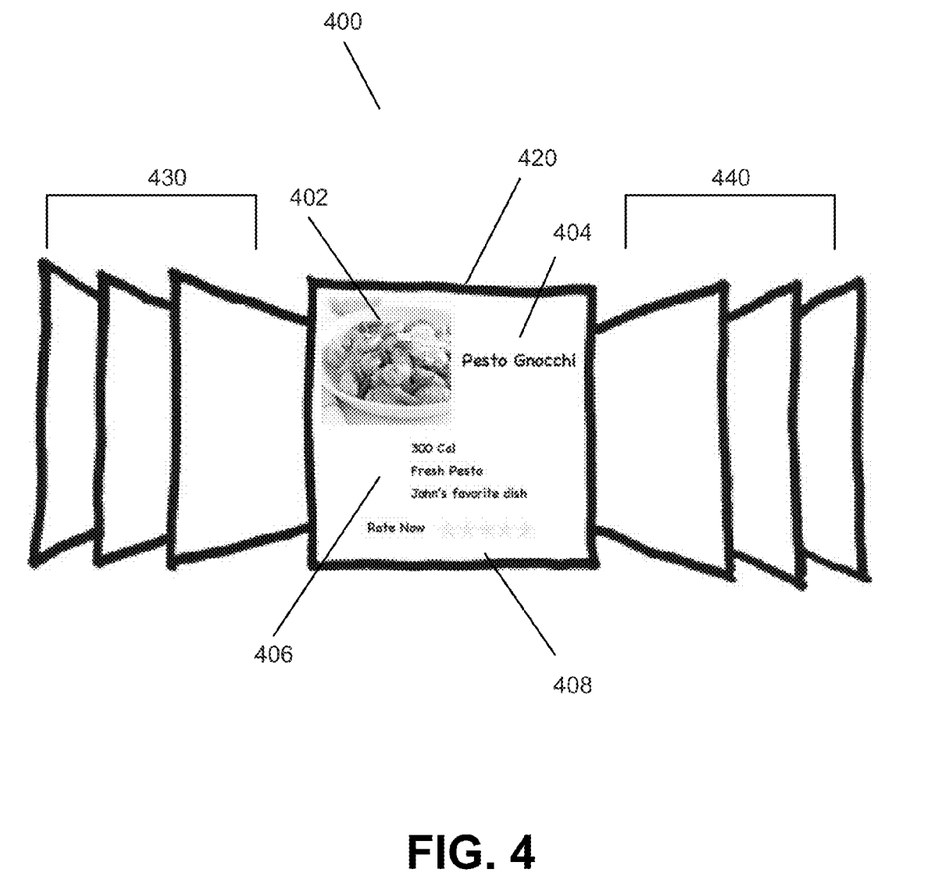
FIG. 4 illustrates an exemplary user display according to aspects of the present invention.

The display seen by the user can take a variety of forms depending on the output device and context in which users view entities. Examples of display formats and presentation include showing one entity and a subset of its attributes at a time, a single column list based view with multiple entities (FIG. 3 provides one realization), a multiple column list based view, a carrousel based view (FIG. 4 provides one realization), a grid based view, a scrolling stream based view, showing one entity at a time, or some combination of such views either in a contextually dependent or arbitrary manner. The display is a means for the user to communicate with the system, which may implements various methods. In some embodiments, a visual display, such as a touch screen of a mobile device, may be used. Other examples of mean of communications are haptic interfaces, heads-up displays, and audio interfaces.

FIG. 3 illustrates an exemplary user display 300 on a user device according to aspects of the invention. In an embodiment of the invention, the user display 300 may display entity evaluations for restaurant venues in a single column. The user may select to show a set of entity evaluations by a specific attribute, as shown by 314, for example, "Suggested Places near . . . " with a pull-down menu 306, with various locations. Each entity may be listed in a single column with a designated section, for example 308 for Samovar Deli, 310 for Dittmer's Gourmet, and 312 for Rincon Sabroso. In each section for each entity, there may be displayed a name of the entity 308(*a*) "Samovar Deli & Cate . . . ", a category of the entity 308(*b*) "Deli", and a rating 308(*c*). A navigation indicator 308(*e*), may be selected to expand into a detail evaluation of the entity named in 308(*a*). There may also be a "remove" or "delete" indicator 308(*d*), to close the entity section 308 and remove it from the set of displayed entity evaluations. Further, there may be other icons or indicators, such as an e-mail icon 308(*f*), to email or contact the corresponding entity.

Other navigation indicators may include a "back" button 302 to return to a previous user display or screen. A textual section 304 may present instructions or other relevant general data.

FIG. 4 illustrates another exemplary user display 400 on a user device according to aspects of the invention, showing a "carousel" based view, wherein a target user may use a finger gesture, such as a swipe, to navigate through different pages for evaluations of different dishes. A page 420 may be displayed for each entity (or dish, in this example), which previous entities and their corresponding pages 430 and subsequent entities and their corresponding pages 440 displayed in a manner in which they may be navigated by the target user by interacting with the user device. The displayed page 420 for an entity may include a name of the entity 404, for example, "Pesto Gnocchi." A selected media object 402, such as a picture, may correspond with the entity. The page 420 may also include an evaluation area 406, with information such as nutritional information, ingredients, or other comments, for example, "John's favorite dish." In other embodiments, the evaluation 406 may comprise comments related to a specific visit or experience, such as, "Too oily". The page 420 may also include a rating 408, which may be on a scale of 1 to 5, or in this example, 1 to 5 stars.

Entities may be displayed with or without an input mechanism for capturing the user evaluation. Additionally, personal information, social information, popular contextual information, or some combination may be displayed as augmented information for the entity to be evaluated where the augmentation is through surrounding text, hover text, spoken with natural voice or a synthesized representation of other information available either in the catalogue or externally.

To facilitate the speedy evaluation of entities the display may asynchronously load unevaluated entities from the catalogue, which may be remote.

Figure 5:
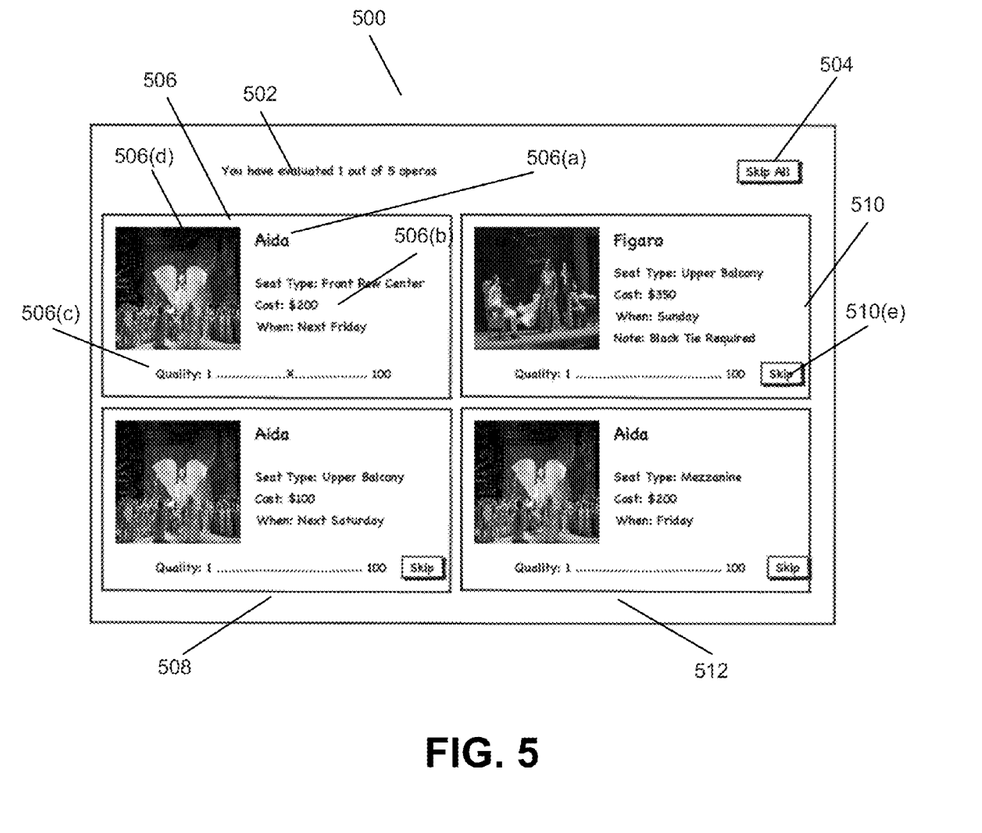
FIG. 5 illustrates an exemplary user display according to aspects of the present invention.

The evaluation display may provide a quick mechanism to skip one or a group of entities queued for evaluation. FIG. 5 is an example of one such realization. FIG. 5 illustrates an exemplary user display 500 for an entity evaluation system providing evaluations of operas. The user display 500 may provide a status 502 of a target user's evaluations, such as, "You have evaluated 1 out of 5 operas." Each opera evaluation may be displayed in a separate section, shown as 506, 508, 510, and 512. Within each evaluation section 506, a name of the entity being evaluated 506(*a*), in this example, an opera title, "Aida," may be displayed. A corresponding media object 506(*d*), may also be displayed. The entity evaluation 506 may comprise specific data related to the entity to be evaluated in 506(*b*), for this example of an opera, a seat selection (e.g., Seat Type: Front Row Center), a price (e.g., Cost: $200), and a date (e.g., When: Next Friday). Further data may include evaluation data, such as a preview of comments, number of relevant users who have seen the opera, comments specific to the seat selection for a specific venue (e.g., New York Metropolitan Opera, SF Davies Symphony Hall). A rating 506(*c*) may also be displayed, in this example, as a slider scale for quality from 1 to 100.

The user display 500 may include navigation indicators, such as a "Skip" button 510(*e*) to skip, remove, or delete a specific entity evaluation, in this example, for the opera "Figaro" in 510, in the case that the target user is only looking for evaluations on "Aida." Or, there may also be an option to "Skip All" 504 if none of the options are desirable or relevant to the target user, for example, if the target user has already seen "Aida" and "Figaro" already and would like to see evaluations for other operas.

Embodiments of the invention involve presenting items, such as entities, to users for evaluation. The system may select which entities are presented for evaluation based on a target user evaluating, or skipping over evaluation, previously existing entities in the system of iterative improvement, as opposed to selecting a static set of entities for evaluation initially. The iterative improvement of the evaluations of existing entities produces canonicalized data. The system may then use a canonicalized set of data derived from a set of existing data sources. Additionally, the system may use location data of the target user, such as social network check-in information, which may take into account which locations were visited, and the frequency of the visits.

In another embodiment of the invention, the system may maximize learning about some aspect of the target user. Further, the system may determine similarities between the target user and other users. For example, the system may choose entities based on ratings that will help make computing similarity between users more efficient. The target entities may be providers of goods or services to end users. The system may select the entities to present to the target user based on user social or demographic data from the affinity graph. Demographic data may include, but is not limited to, features of users learnable from pre-existing information, such as the user's affinity graph. Demographic data may also include income, age, etc. Other examples of demographic data also include how other users perceive the target user (e.g., whether users that the target user follows indicate that the target user is a "foodie").

In embodiments of the invention, the system may display media objects to the user, such as a photo of a restaurant or a dish in combination with presenting the item for evaluation. In some such embodiments, the system uses information received to draw inferences about the media object; for instance, it might learn that one photo leads to higher ratings than others. Similarly, another embodiment might capture and draw inferences from other information related to the evaluation, such as contextual information about what the user was doing, the time of day, and which means, such as a mobile device or desktop computer, by which the user was interacting with the system. In other embodiments other information about an entity may be captured with the evaluation, such as facts about the entity that the user may know.

The description provides preferred exemplary embodiment(s) only, and is not intended to limit the scope, applicability or configuration of the invention. Rather, the description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Further embodiments may be envisioned to one of ordinary skill in the art after reading this disclosure. In other embodiments, combinations or sub-combinations of the above disclosed invention may be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A computer-implemented method for evaluation of an entity by a target user based at least on stored data about the target user, wherein the entity is an entity of a set of entities, and evaluation is related to the entity, the method comprising:
receiving, at a server computer, entity data relating to a particular entity, wherein the entity data includes a relevance based on a rating and a weight based on a relationship with the target user for a particular user that provided the entity data through a particular data source;
determining, by the server computer, a set of entity evaluations to request from the target user based on the weight and the relevance;
from the set of entity evaluations to request, generating, at the server computer, a set of predicted entity evaluations for one or more entities relevant to the target user based on the entity data, user data, and relevance;

determining an order of relevance of the relevant entities based at least in part on the relevance and the weight to increase accuracy of the predicted entity evaluations; and communicating, from the server computer to the target user, the order of relevance of the one or more relevant entities;

after communicating the order of relevance, receiving, from a user device, evaluation data from the target user that is based on an evaluation received through input via the user device;

in response to receiving the evaluation data, increasing the accuracy of the predicted entity evaluations by computing a similarity among the target user and the particular user.

2. The method of claim 1, further comprising:

obtaining, at the server computer, personal data from the one or more of data sources, wherein the personal data is associated with the target user in a plurality of users;

storing the personal data at the server computer, wherein personal data associated with the plurality of users is stored in a user database;

merging, by the server computer, the personal data from the plurality of data sources;

mapping, by the server computer, the personal data from the plurality of data sources to the target user;

updating the user database with the personal data and stored data associated with the target user;

determining, at the server computer, whether an entity is associated with the personal data from the target user;

wherein the order of relevance of the set of entity evaluations to request is based at least in part on the personal data from the target user.

3. The method of claim 2, wherein the relevance to the target user is based at least in part on location data including geographical data identifying the location of the target user.

4. The method of claim 3, wherein the location data is determined from personal data received through a social networking site data source.

5. The computer-implemented method of claim 2, wherein the communicating further comprises:

determining a set of media objects associated with the set of entity evaluations to request; and displaying the set of media objects with the set of entity evaluations to request.

6. The method of claim 2, wherein the personal data is used for the order of relevance to prioritize places the target user has visited over those they have not.

7. The method of claim 1, further comprising:

obtaining, at a server computer, data from a plurality of data sources about entities in the set of entities;

merging, using the server computer, the entity data from the plurality of data sources;

storing the entity data at the server computer in an entity database;

mapping, using the server computer, an entity-specific subset of the entity data from the entity database, wherein the entity-specific subset pertains to a corresponding entity;

differentiating, using the server computer, portions of the entity-specific subset according to which of the plurality of data sources the portion derived from;

determining, using the server computer, a relevance associated with the entity specific subset and the data source, wherein the relevance is determined by a computer process to cross-reference the entity data and data source;

assigning, by the server computer, a weight to the entity data and the data source associated with the entity data based on the relevance; and updating the entity database with the entity data associated with the corresponding entity.

8. The computer-implemented method of claim 1, wherein the evaluation is received through input via the user device that includes finger gestures, clicking, shaking the user device, a coordinate motion between two user devices, blowing on the user device, spinning the user device, making a sound, or speaking a voice command.

9. The computer-implemented method of claim 1, wherein the order of relevance is based at least in part on a frequency in which an entity or entity evaluation has been previously queried.

10. The computer-implemented method of claim 1, further comprising:

computing a confidence score for each predicted entity evaluation in the set of predicted entity evaluations;

after receiving the evaluation data, updating the confidence score.

11. The method of claim 1, wherein the order of relevance is based at least in part on prioritizing predicted evaluations that predict the target user will have an extreme opinion in an evaluation.

12. The method of claim 11, wherein the extreme opinion in the evaluation includes opinions that differ from the geographic norm.

13. The method of claim 11, wherein the extreme opinion in the evaluation includes opinions that differ from the global norm.

14. A server computer comprising a processor and a non-transitory computer-readable medium, the non-transitory computer-readable medium comprising code executable by the processor to implement a method for evaluation of an entity by a target user based at least on stored data about the target user, wherein the entity is an entity of a set of entities, and evaluation is related to the entity, the method comprising:

receiving, at a server computer, entity data relating to a particular entity in the set of entities, wherein the entity data includes a relevance based on a rating and a weight based on a relationship with the target user for a particular user that provided the entity data through a particular data source;

determining, by the server computer, a set of entity evaluations to request from the target user based on the weight and the relevance;

from the set of entity evaluations to request, generating, at the server computer, a set of predicted entity evaluations for one or more entities relevant to the target user based on the entity data, user data, and relevance;

determining an order of relevance of the relevant entities based at least in part on the relevance and the weight to increase accuracy of the predicted entity evaluations; and communicating, from the server computer to the target user, the order of relevance of the one or more relevant entities;

after communicating the order of relevance, receiving, from a user device, evaluation data from the target user that is based on an evaluation received through input via the user device;

in response to receiving the evaluation data, increasing the accuracy of the predicted entity evaluations by computing a similarity among the target user and the particular user.

15. The server computer of claim 14, the method further comprising:
obtaining, at the server computer, personal data from the one or more of data sources, wherein the personal data is associated with the target user in the plurality of users;
storing the personal data at the server computer, wherein personal data associated with the plurality of users is stored in a user database;
merging, by the server computer, the personal data from the plurality of data sources;
mapping, by the server computer, the personal data from the plurality of data sources to the target user;
updating the user database with the personal data and stored data associated with the target user;
wherein the order of relevance of the set of entity evaluations to request is based at least in part on the personal data from the target user.

16. The server computer of claim 15, wherein the relevance to the target user is based at least in part on location data including geographical data identifying the location of the target user.

17. The server computer of claim 16, wherein the location data is determine from personal data received through a social networking site data source.

18. The server computer of claim 15, wherein the communicating further comprises:
determining a set of media objects associated with the set of entity evaluations to request; and
displaying the set of media objects with the set of entity evaluations to request.

19. The server computer of claim 15, wherein the personal data is used for the order of relevance to prioritize places the target user has visited over those they have not.

20. The server computer of claim 14, the method further comprising:
obtaining, at a server computer, data from a plurality of data sources about entities in the set of entities;
merging, using the server computer, the entity data from the plurality of data sources;
storing the entity data at the server computer in an entity database;
mapping, using the server computer, an entity-specific subset of the entity data from the entity database, wherein the entity-specific subset pertains to a corresponding entity;
differentiating, using the server computer, portions of the entity-specific subset according to which of the plurality of data sources the portion derived from;
determining, using the server computer, a relevance associated with the entity-specific subset and the data source, wherein the relevance is determined by a computer process to cross-reference the entity data and data source;
assigning, by the server computer, a weight to the entity data and the data source associated with the entity data based on the relevance; and
updating the entity database with the entity data associated with the corresponding entity.

21. The server computer of claim 14, wherein the evaluation is received through input via the user device that includes finger gestures, clicking, shaking the user device, a coordinate motion between two user devices, blowing on the user device, spinning the user device, making a sound, or speaking a voice command.

22. The server computer of claim 14, wherein the order of relevance is based at least in part on a frequency in which an entity has been previously queried.

23. The server computer of claim 14, further comprising:
computing a confidence score for each predicted entity evaluation in the set of predicted entity evaluations; and
after receiving the evaluation data, updating the confidence score.

24. The server computer of claim 14, wherein the order of relevance is based at least in part on prioritizing predicted evaluations that predict the target user will have an extreme opinion in an evaluation.

25. The server computer of claim 24, wherein the extreme opinion in the evaluation includes opinions that differ from the geographic norm.

26. The server computer of claim 24, wherein the extreme opinion in the evaluation includes opinions that differ from the global norm.

* * * * *